(12) United States Patent
Scala (10) Patent No.: US 7,021,897 B2
(45) Date of Patent: Apr. 4, 2006

(54) BLADE PITCH CONTROL DISK DEVICE FOR A ROTORCRAFT ROTOR

(75) Inventor: Vincent Scala, Lancon de Provence (FR)

(73) Assignee: Eurocopter, Marignane (FR)

( * ) Notice: Subject to any disclaimer, the term of this patent is extended or adjusted under 35 U.S.C. 154(b) by 130 days.

(21) Appl. No.: 10/735,178

(22) Filed: Dec. 12, 2003

(65) Prior Publication Data

US 2004/0126238 A1    Jul. 1, 2004

(30) Foreign Application Priority Data

Dec. 13, 2002    (FR) .................................. 02 15824

(51) Int. Cl.
    *B64C 27/605* (2006.01)
(52) U.S. Cl. .................... 416/114; 416/134 A
(58) Field of Classification Search ................ 416/114, 416/134 A, 141, 170 R
    See application file for complete search history.

(56) References Cited

U.S. PATENT DOCUMENTS

| | | |
|---|---|---|
| 4,630,998 A | 12/1986 | Leman |
| 5,785,497 A | 7/1998 | White et al. |
| 6,033,182 A | 3/2000 | Rampal |
| 6,152,696 A * | 11/2000 | Rampal ...................... 416/114 |
| 6,280,141 B1 | 8/2001 | Rampal et al. |

FOREIGN PATENT DOCUMENTS

| | | |
|---|---|---|
| DE | 36 03 400 | 5/1987 |
| DE | 36 20 794 | 12/1987 |

OTHER PUBLICATIONS

INPI (French Patent Office) Preliminary Search Report, dated Aug. 14, 2003.

* cited by examiner

*Primary Examiner*—Edward K. Look
*Assistant Examiner*—Richard A. Edgar
(74) *Attorney, Agent, or Firm*—Young & Thompson (57) ABSTRACT

A cyclic swashplate device for controlling rotorcraft blade pitch is disclosed for application to rotorcraft swashplates, in particular, in helicopters. A cyclic swashplate device controls the rotorcraft blade pitch. The device (10'), with rotating (10') and non-rotating (14') cyclic swashplates is designed in such a way that at least one of the two disks includes a modular link fitting assembly (46, 42) ensuring the links with the disk (12', 14') and the pitch connecting rods (6) and/or at least one driving device or with the pilot control devices (17) and/or at least one retaining device. Interconnecting fittings are attached rigidly and separately to an annular device, such as one of the rings (31', 30') of a bearing (21') on the corresponding disk (14', 12').

20 Claims, 6 Drawing Sheets

BLADE PITCH CONTROL DISK DEVICE FOR A ROTORCRAFT ROTOR

BACKGROUND OF THE INVENTION

1. Field of the Invention

This invention concerns the blade pitch control cyclic swashplate devices for the rotor of a rotorcraft or a rotary wing aircraft.

2. Description of Related Art

In the technical field of rotary wing aircraft, it is known that a cyclic swashplate device is a specific device designed to transmit flight movements, set to a fixed index point with respect to the aircraft, toward the blades set on a rotating index, with the rotor shaft, about the axis of rotation of the latter.

SUMMARY OF THE INVENTION

Figure 1:
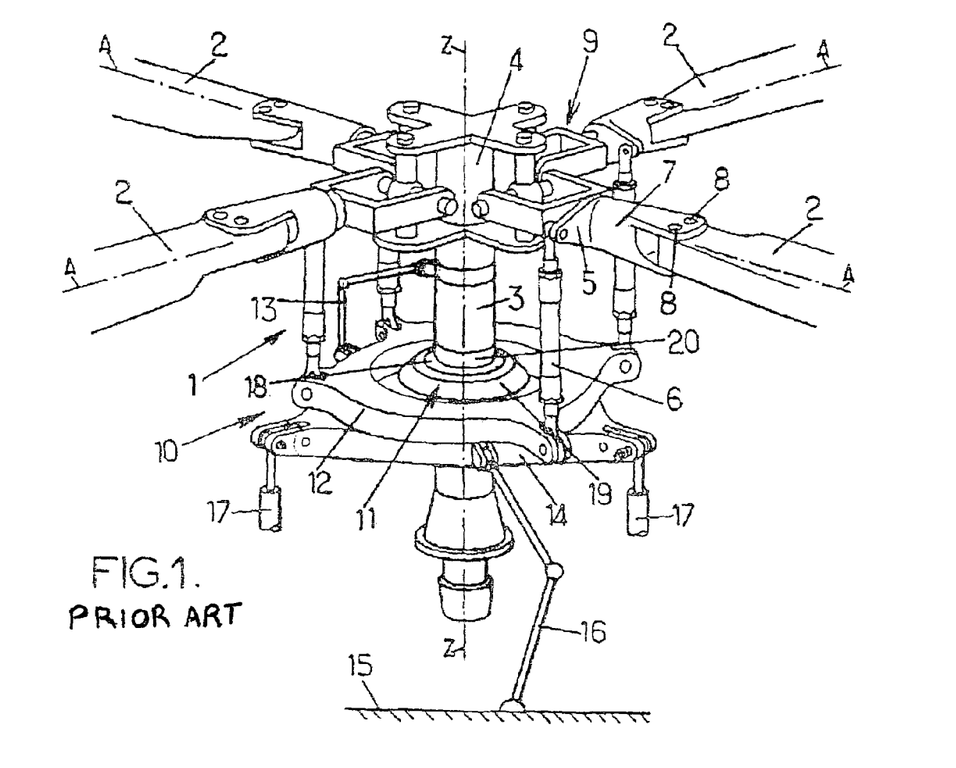
FIG. 1 is a schematic representation of a four-blade rotor head equipped with cyclic swashplates according to the state of the technique, with an axial translation and tilting guide mechanism equipped with a central swivel, and devices driving the rotating disk and retaining the non-rotating disk consisting respectively of rotating and non-rotating compasses, which device is described above.

More specifically, the invention refers to a cyclic swashplate device for controlling the pitch of rotor blades, in particular a main helicopter rotor, which rotor is of the type shown schematically in FIG. 1, and for which each blade 2 is, on the one hand, driven in rotation about an axis of rotation Z—Z of a shaft 3 of rotor 1, or shaft Z—Z of rotor 1, by means of a hub 4 integral in rotation with shaft 3, and also integral in rotation about a longitudinal axis of pitch change A—A of blade 2, with at least one pitch lever 5 controlled by a corresponding pitch connecting rod 6.

Figure 9:
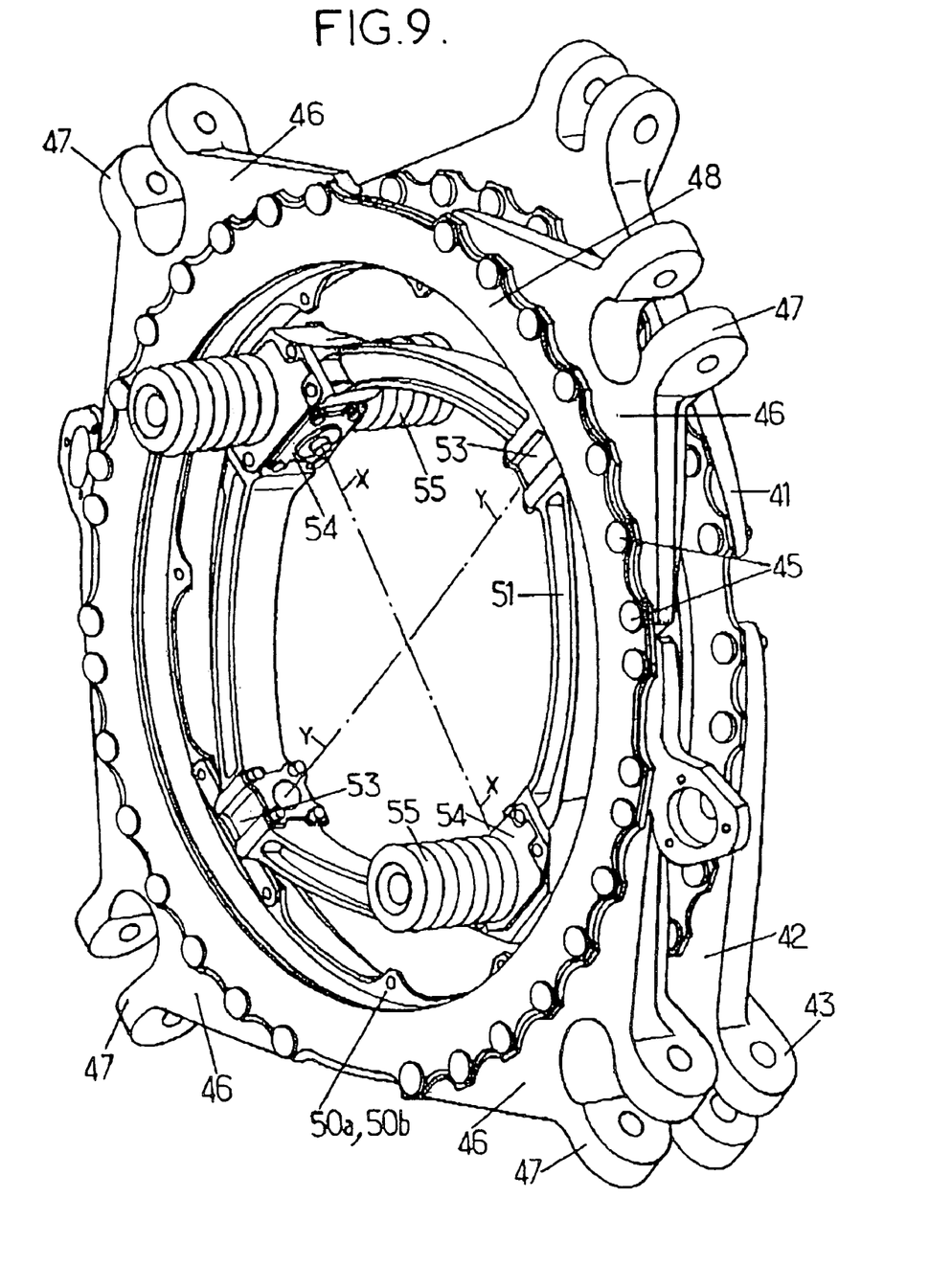
FIG. 9 is a schematic perspective view corresponding approximately to FIG. 7, with a representation of the universal joint ring and the slides guiding the device on two non-rotating columns.

As an example, in rotor 1 of FIG. 1, each pitch lever 5 protrudes on the leading edge side of corresponding blade 2 onto a sleeve 7 connecting said blade 2 to hub 4, sleeve 7, whose blade 2 is integral in rotation about the pitch axis A—A through its foot, linked with sleeve 7 by two pins 8, sleeve 7 itself being articulated on hub 4 in pitch, flapping and drag, by an articulating mechanism rotating about three contributing axes perpendicular in two's as shown overall in FIG. 9.

More specifically, the invention refers to a pitch control type device including a set of cyclic swashplates 10, including two annular and coaxial disk (one rotating disk and one non-rotating disk) enclosing the axis Z—Z of rotor 1, and mounted on a mechanism 2 guiding it in its axial translation (parallel to axis Z—Z of rotor 1 for controlling the collective pitch of blades 2), and in tilting (inclined in any direction about the axis Z—Z of rotor 1 to control the cyclic pitch of blades 2) of the disks with respect to axis Z—Z of rotor 1, and of which one is a rotating disk 12 connected, on the one hand to hub 4 and/or to shaft 3 by at least one device 13 driving the rotary disk 12 in rotation with rotor 1 about axis Z—Z of the latter, and, on the other hand, with each blade 2 through the corresponding pitch connecting rod 6, with said rotating disk 12 mounted to rotate via at least one bearing, with bearing housings generally comprising one or two ball races, on the other disk which is a non-rotating disk 14, itself connected on the one hand to aircraft structure 15 by at least one retaining device 16 immobilizing the non-rotating disk 14 in its rotation about axis Z—Z of rotor 1, and on the other hand, to the pilot control devices 17, which solicit the non-rotating disk 14 in such a way that the axial and/or tilting movements imposed on the non-rotating disk 14 from the pilot controls are followed by rotating disk 12 which transmits the pitch to be imparted to blade 2 of rotor 1 via the pitch connecting rods 6.

In general, the two disks 12 and 14 enclose shaft 3, and the pilot control devices 17 are three servo control actuating devices (linear actuators) or similar actuating devices arranged between the non-rotating disk 14 and the structure 15 of the rotorcraft, each articulated by swivels at their lower and upper ends respectively on said structure 15 and in a respective yoke of non-rotating disk 14, whereas the pitch connecting rods 16 are understood to be between rotating disk 12 and pitch levers 5 of rotor 1 blades 2 and are articulated by swivels at their upper and lower ends respectively on pitch levers 5 and in yokes set out on the perimeter of rotating disk 12.

More often than not, mechanism 2 providing axial translation guidance and tilting guidance of cyclic swashplates 12 and 14 include a central swivel 18, centered on the axis Z—Z of rotor 1, on which one of the disks, in general the non-rotating disk 14, and therefore also the rotating disk 12 connected to disk 14 by the bearing, are mounted to oscillate, by at least one concave bearing surface plate 19 forming a spherical gap and working together with swivel 19, which is mounted to slide endwise (parallel to the axis Z—Z of rotor 1) about a cylindrical guide 20 coaxial with axis Z—Z and not rotating about this axis of rotor 1, and that is generally fixed with respect to the structure 15 of the rotorcraft. When the cyclic swashplates 12 and 14 enclose shaft 3, which is more often than not the case, cylindrical guide 20 will be tubular, enclose shaft 3 and will be attached to a housing integral with rotorcraft structure 15 and enclose the basic link of shaft 3 to the main transmission box which drives shaft 3, and therefore rotor 1, in rotation about the axis Z—Z.

Also more often than not, the driving device (devices) 13 of rotating disk 12, in rotation and/or the retaining devices 16, will prevent the rotation of the non-rotating disk 14, and is or are one or several compasses respectively rotating or not rotating, with two arms articulating scissors-wise and that are connected together by a pivot or hinge, enabling the two arms on each compass to spread apart or move closer to one another allowing the movements of disks 12 and 14 in the direction of rotor 1 axis Z—Z, because the upper and lower arms of each rotating compass 13 are also articulated respectively on shaft 3 or hub 4 of rotor 1 and on rotating disk 12, and in such a way that the lower and upper arms of each non-rotating compass 16 are furthermore articulated on structure 15 of the rotorcraft and on the non-rotating disk 14.

However, to remedy some of the drawbacks inherent in the use of rotating and/or non-rotating compasses, it has already been proposed to equip the cyclic swashplate devices with driving and/or rotating devices having another structure, for instance a rotating or non-rotating pin, radially protruding toward the outside of the respectively rotating or non-rotating disk and engaged in a ramp, itself rotating with the rotor or, on the contrary, not rotating and connected to the rotorcraft structure as described respectively in U.S. Pat. Nos. 6,280,141 and 6,033,182 or yet again to use a mechanism guiding the translation and tilting of cyclic swashplates 12 and 14 which has a structure different from that including a central swivel 18 as described above, and which has two guide columns, parallel to the rotor axis and symmetrical with one another either side of this axis in the same diametric plan passing through the rotor axis in a mechanism also including a universal joint link with an intermediate universal joint ring mounted to slide endwise on the columns, and articulated to swivel on these columns about a first diametrical axis of the ring, which is an axis remaining perpendicular to axis Z—Z of rotor 1, whereas the universal joint ring is also articulated to swivel on one of the two disks 12 and 14 about a second diametrical axis of the universal joint ring which is perpendicular to the first diametrical axis as proposed by DE-A-36 03 400 and DE-A-36 20 794, as well as in aforementioned U.S. Pat. Nos. 6,280,141 and 6,033,182. Accordingly, end movements of the disks 12 and 14 and of the universal joint ring are guided by the two columns, whereas the tilting of the disks 12 and 14 in any direction about the axis Z—Z of rotor 1 are obtained by the swiveling of the cyclic swashplates 12 and 14 with respect to the universal joint ring about one of the two diametrical and perpendicular axes of said ring, and by the swiveling of the ring on the columns about either of these two perpendicular diametrical axes.

The guide columns may be of the rotating type (integral with rotor rotation) and therefore, in addition, the ring of the universal joint mounted in this case between the rotating columns on the one hand, and on the other, the rotating disk driven thus in rotation by the columns and the rings replacing the rotating compass (compasses) (see U.S. Pat. No. 6,033,182). But the guiding columns may also not rotate, i.e. be retained to prevent them from rotating about axis Z—Z of rotor 1 by a support attached to the rotorcraft structure, in which case the universal joint ring is also non-rotating and is mounted between, on the one hand, the non-rotating columns, and on the other, the non-rotating disk thus retained in rotation by the non-rotating columns and the non-rotating universal joint ring replacing the non-rotating compass (or compasses) (see U.S. Pat. No. 6,280,141).

Note that the use of rotating or non-rotating guide columns does not prevent the simultaneous use of one or several compasses respectively non-rotating or rotating, because a device including both non-rotating columns and rotating columns is not to be used in that it would not permit all the tilting movements required by the cyclic pitch controls and provided through the universal joint ring.

Figure 2:
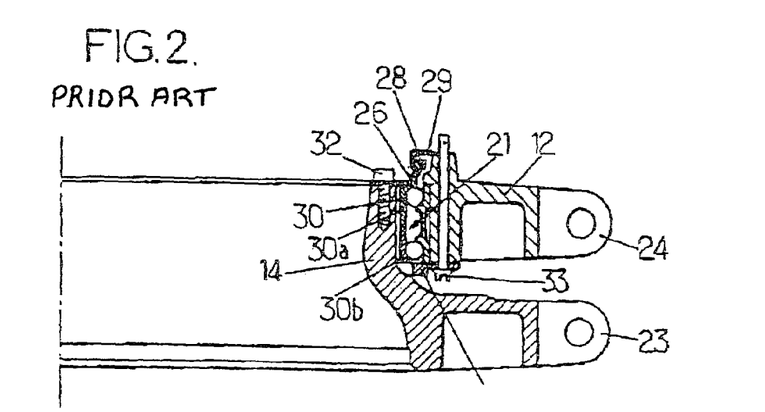
FIGS. 2 and 3 are partial schematic views respectively of an axial section and plan view of a cyclic swashplate device according to the technique, similar to that of FIG. 1 but with a translation and tilting guide mechanism of another known type, with a translated and articulated swiveling universal joint ring on two non-rotating columns.
Figure 3:
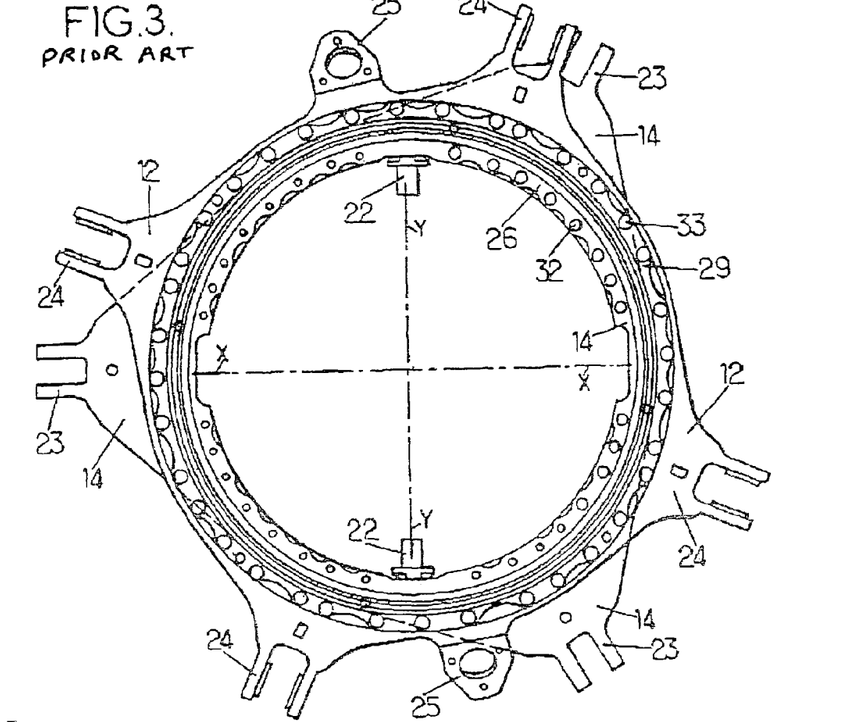

The cyclic swashplate device in the technical embodiment now current, schematically and partially shown in a transversal half cross-section in FIG. 2 and in a plan drawing of FIG. 3, is actually a fixed column device (not shown) on which the universal joint ring (also not shown) slides endwise and may tilt by two coaxial swiveling links, about diametrical axis X—X, whereas the non-rotating disk 14, in the internal radial position with respect to rotating disk 12 and bearing 21 with two rows of balls interposed between two disks 12 and 14, supports two trunnions of universal joint 22 placed diametrically opposite each other and protruding radially toward the center of non-rotating disk 14, and that are coaxial about a second diametrical axis Y—Y on which trunnions 22 pivot on the universal joint ring.

Each of disks 12 and 14 is a solid monoblock and costly annular part because its engineering requires lengthy, tricky and accurate machining to obtain not only bearing surfaces cooperating with the rings of bearing 21, but also the three yokes 23, radially protruding toward the outside of lower axial part of non-rotating disk 14, to take over from the pilot control devices such as 17 in FIG. 1 and the four yokes 24 (for a four-blade rotor), protruding radially toward the outside on rotating disk 12, for taking up the lower ends of pitch connecting rods such as 6 in FIG. 1, and the two interconnecting fittings 25, which may also be arranged as a yoke to take up the lower end of the lower arms of the two rotating compasses (not shown but like 13 in FIG. 1) to drive the rotating disk 12 in rotation.

The embodiment of FIGS. 2 and 3 also reveals the following drawbacks in that bearing 21 would have to be manufactured to specific dimensions; bearing 21 is mounted tight against rotating disk 12 of non-rotating disk 14, or even both disks 12 and 14, leading to assembly difficulties in the workshop, or in the event of the replacement of at least one of disks 12 and 14 at a user's, all the more so in that a corrosion fretting problem may arise at the interface level of bearing 21 assembly, also calling for the use of two flanges 26 and 27 attaching this bearing 21 to disks 14 and 12, and seal 28 and corresponding seal support 29, upper attaching flange 26 of inner ring 30 of bearing 21 also ensuring the pre-stressing of the same inner ring 30, split into two half-rings 30a and 30b, each for one of the two ball races and which are axially placed end to end and clamped against one another by the attaching of upper flange 26 to the upper end of non-rotating disk 14 by means of an attaching screw crown 32, which pre-stressing avoids any lifting away of the parts forming bearing 21, and therefore any unwanted relative movement, because of lower flange 27 retaining outer ring 31 of bearing 21 by means of a screw crown 33 attaching flange 27 under rotating disk 12, screws 33 retaining simultaneously, above rotating disk 12, support 29 of seal 28; the arrangement of all the cyclic swashplates 12 and 14 around the shaft, as in case 3 of FIG. 1, necessarily involves, in the event of a problem among users or on one of the arms arranged to form a yoke 23 or 24 on non-rotating disk 14 and rotating disk 12, removal of the main rotor assembly as shown in 1 of FIG. 1, i.e., of hub 4 and blades 2, which problem may be due to play in the assemblies, loss of torque load, corrosion phenomena, the appearance of cracks, blows received by these elements. The problems encountered on cyclic swashplates 12 and 14 are also due to the actual definition of each of the disks which consists of a large size rough part, therefore having a considerable weight and a high cost price.

The problem at the basis of the invention is to correct the drawbacks of the cyclic swashplate devices of the prior technique, in terms of complexity, numbers of parts, weight, cost of maintenance and cost of manufacturing.

The purpose of the invention is to propose a system of simple design cyclic swashplates, using non-rotating and rotating modular link fittings that are simple to assemble and maintain among users, with a considerable gain in terms of weight and price.

For this purpose, the cyclic swashplate device according to the invention for a rotor of the type shown above, itself of a type comprising two annular and coaxial disks enclosing axis Z—Z of the rotor and mounted on an endwise translation guide mechanism and also tilting for said disks with respect to rotor axis Z—Z, and of which one is a rotating disk connected, on the one hand to the hub and/or the rotor shaft, by at least one device driving the rotating disk in rotation with the rotor, about its axis Z—Z, and on the other, with each blade by the corresponding pitch connecting rod, said rotating disk being mounted to rotate by at least one bearing on the other disk, which is a non-rotating disk connected, on the one hand, to the structure of said rotorcraft by at least one retaining device immobilizing said non-rotating disk in rotation about said axis of rotor Z—Z, and on the other, with pilot control devices soliciting the non-rotating disk so that the axial and/or tilting translation movements imposed on the non-rotating disk from the pilot controls are followed by the rotating disk which transmits the pitch to be imparted to the rotor blades through pitch connecting rods is characterized in that at least one of the two disks includes a modular assembly of interconnecting fittings to ensure links between said disk and the pitch connecting rods and/or said driving device or with the pilot control devices and/or said retaining device at least, and in that the interconnecting fittings of said assembly are fixed rigidly and irremovably to an annular device of the corresponding disk.

Naturally, the fittings for interconnection with one or several driving devices and/or with one or several retaining devices are only needed insofar as the rotation of the rotating disk with the rotor and/or the retention of the non-rotating disk against any rotation is or are not ensured by the translation and tilting guide mechanism structure of the cyclic swashplates.

In an advantageous embodiment, the modular assembly of interconnecting fittings of said non-rotating disk includes the first non-rotating interconnecting fittings that are identical to one another, in numbers equal to side pilot control devices, and each of which connects said non-rotating disk respectively to one of said pilot control devices, and/or said modular assembly of interconnecting fittings of said rotating disk includes the first rotating interconnecting fittings, identical to one another, in numbers equal to the pitch connecting rods, and each of which connects said rotating disk to respectively one of said pitch connecting rods. If the driving devices of the rotating disk or those retaining the non-rotating disk fitted to the device are independent of the translation and tilting guide mechanism, the device would advantageously have the modular assembly of interconnecting fittings of said non-rotating disk include at least a second non-rotating link fitting, in numbers equal to at least one said retaining device to connect said non-rotating star to at least one retaining device and/or said modular assembly of interconnecting fittings to said rotating device, include at least one second rotating interconnecting fitting in numbers equal to at least one driving device, to connect said rotating disk to at least one said driving device.

Accordingly, by individually and separably attaching to the annular device of the rotating disk the first rotating link fittings and, as necessary, one or a second rotating link fittings, by this modular assembly of rotating link fittings, it is possible to reconstruct a rigid annular assembly corresponding essentially to a traditional rotating disk, while benefiting from the advantage of being able to individually disassemble and remove and rotating link fitting from this assembly and replace it, as the need arises, without action on the other rotating link fittings and without requiring the removal of the rotor.

The same applies to the first non-rotating link fittings and, where applicable, one or a second non-rotating link fittings, which, when attached individually and separably to the annular device of the non-rotating disk, reconstruct a rigid annular assembly corresponding essentially to a conventional non-rotating disk with the same advantages as outlined above for the disassembly and removal of each of the non-rotating fittings of the corresponding assembly.

These advantages are even more marked if the annular device of at least one of the disks, but preferably of each of them, consists respectively of the inner and outer rings of the rotary assembly bearing of the rotating disk on the non-rotating disk.

However, to allow the adaptation of at least one modular set of interconnecting fittings to at least one of the two disks of the existing cyclic swashplate assembly, while preserving the bearing and assembly mode, it may be advantageous that, according to the invention, the annular device of at least one disk is an intermediate ring force-fit with one of the inner and outer rings of said bearing, this arrangement being adopted for both rings if the need arises.

Further, that the annular device to which the interconnecting fittings of an assembly are secured removably, is one of the rings of the bearing or an intermediate ring force-fit with one of the rings of the bearing with the attachment of the interconnecting fittings on the same assembly facilitated if these fittings are attached to the annular device of the corresponding disk via a collar integral with said annular device, and on which the interconnecting fittings are secured removably, preferably by bolting onto the corresponding collar, or by any other equivalent means of mechanical attachment.

Advantageously, each interconnecting fitting will have a plane form that is more or less triangular, with one side forming a concave circle arc arranged as the attaching base with a perimeter part of said annular device corresponding to it, or with said corresponding collar, while the summit opposite said concave side is arranged to form a yoke or an end taking up the end swivel of a pitch connecting rod or a pilot control device or, where necessary, a drive device or a corresponding retaining device.

If the interconnecting fittings are secured to collars, it is advantageous for the ring (inner or outer) of the bearing linked in rotation with the rotating disk to be integral with an upper collar protruding more or less radially toward the outside of the bearing from the upper end of said ring linked with the rotating disk and with respect to axis (Z—Z) of the rotor, whereas the other bearing ring, connected to the non-rotating disk, is integral with a lower collar, protruding more or less radially toward the outside of the bearing from the lower end of said other ring (linked with the non-rotating disk).

In this configuration, each pilot control device will preferably be linked by a swivel-mounted link to respectively one of said non-rotating link fittings secured removably to said lower collar and/or each pitch connecting rod, preferably connected by a swivel-mounted link to respectively one of said first rotating link fittings secured removably to said upper collar.

Similarly, when at least one retaining device and/or at least one separate driving device of said translation and tilting guide mechanism is or are necessary, said at least one retaining device will be connected by a swivel-mounted link to a second non-rotating link fitting respectively secured removably to said lower collar and/or said at least one driving device connected by a swivel-mounted link to a second respective rotating link fitting secured removably to said upper collar.

The link fittings of at least one modular assembly can be constructed of aluminum alloy or composite material based on an aluminum or titanium metal matrix or from blanks or from forged or dye-punched blanks or plates.

When the bearing has two roller races, to ensure the pre-loading of the bearing in accordance with the embodiment of the technique, one of the bearing rings integral with one of the two non-rotating and rotating disks attached to said translation and tilting guide mechanism, will be subdivided into two half-rings placed endwise, end to end, each provided with one respectively of the two adjacent radial collars, tightened endwise against one another to ensure the pre-stressing of the bearing and through which said disk is attached to said translation and tilting guide mechanism.

In a known manner, the translation and tilting guide mechanism may include a central swivel, centered on rotor axis Z—Z on which the non-rotating disk is mounted to oscillate by at least one block with a spherical cap bearing surface, said swivel mounted to slide parallel to the Z—Z axis of the rotor about a cylindrical guide coaxial with rotor axis Z—Z and not rotating about said rotor axis Z—Z, and preferably attached with respect to rotorcraft structure.

In this case, it is advantageous for said at least one plate to be connected removably, preferably by bolting, onto the two adjacent radial collars pre-stressing said internal bearing ring.

But as known, the translation and tilting guide mechanism may also include a universal joint link with a universal joint ring mounted to swivel, on the one hand, about first axis diametrically corresponding to the ring of the universal joint and perpendicular to the axis of the rotor, by two swiveling links coaxial with the two slides guided in axial translation, each respectively on one of the two guide columns parallel with the axis of the rotor and both symmetrical with respect to said axis in the same diametrical plane passing through the latter and, on the other hand, about a second diametrical axis, perpendicular to the first diametrical axis, by two swiveling links with end trunnions placed diametrically opposite each other, connecting the universal joint ring to that of the two non-rotating and rotating disks, connected to said translation and tilting guide mechanism.

In this case, it is also advantageous for the two trunnions, for the assembly swiveling on the universal joint ring, supported by two adjacent radial collars provided for on the two internal half-rings of the bearing, to ensure axial pre-stressing.

BRIEF DESCRIPTION OF THE DRAWINGS

Other advantages and characteristics in the invention will result from the description given below, considered non-limitative, of two examples of embodiments described with references to the attached Figs., in which.

DETAILED DESCRIPTION OF THE INVENTION

Figure 4:
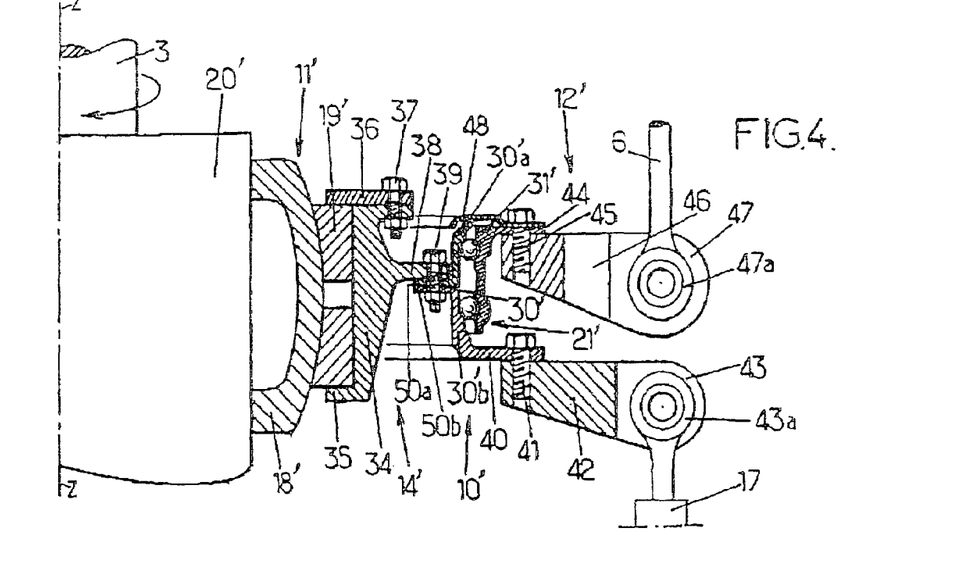
FIG. 4 is a partial schematic sectional and axial view of an initial embodiment of the cyclic swashplate device according to the invention.

FIG. 4 is an axial half-section view of the central part of a cyclic swashplate device 10' according to the invention with general architecture similar to that of the cyclic swashplate device of FIG. 1 as concerns the translation and tilting guide mechanism 11', with a central swivel, and the respective driving devices such as 13 and retaining devices such as 16, or respectively rotating and non-rotating compasses mounted to rotor 1 according to FIG. 1, in such a way that the same numerical references as in FIGS. 1 to 3 are provided, but assigned with a prime symbol and used to designate the elements corresponding to the example of FIG. 4.

In this FIG. 4, there is therefore a cylindrical tubular guide 20', coaxial with the rotor axis Z—Z and not rotating about it, because it is attached to the rotorcraft structure, said guide 20' enclosing, without contact, rotor shaft 3 and a central swivel 18', amounted to slide parallel to the axis Z—Z about the guide 20'.

An annular plate 19' comprising two segments, having an internal radial bearing surface forming a concave spherical cap corresponding to the convex side of the outer side of swivel 18', mounted to oscillate on swivel 18', and the two segments of plate 19' maintained to slide together against swivel 18' by an annular flange 34 with an internal radial collar 35 at the lower axial end and a collar 36 attached to the upper axial end, on which collar 36 is attached by screw crown 37. Radially towards the outside and in its central part, the annular flange has an outer collar 38, onto which are bolted, by an axial screw crown 39, the two internal radial collars 50a and 50b, superimposed, and protruding, with respect to which the lower and upper respective ends of the inner upper half-ring 30'a and the lower inner half ring 30'b are placed axially end to end to form an inner ring 30' of bearing 21' with two oblique contact ball races. Accordingly, the two inner collars 50a and 50b of the inner half-rings 30'a and 30'b are used not only for pre-stressing bearing 31', but also for attaching inner ring 30' of the latter to the axial translation and tilting guide mechanism 11' comprising annular flange 34, plate 19' and swivel 18' sliding axially on guide 20'.

The inner ring 30', in this way with flange 34, forms part of the non-rotating disk 14' attached to this guide mechanism 11'.

At its lower axial end, the inner lower half-ring 30'b is integral with a radial collar 40, protruding toward the outside of bearing 21', and on the perimeter of which are attached individually and separably, by axial screws 41, non-rotating link fittings, of a modular assembly of said non-rotating fittings comprising three link fittings 42, the outer radial end of which is arranged to form a yoke 43, and each of which is designed to ensure the linking of non-rotating disk 14' with swivel 43a of the upper end of respectively one of the three pilot servocontrols 17 controlling translation and tilting of non-rotating disk 14', said assembly of non-rotating link fittings also including another fitting (not shown), also bolted separately under the outer perimeter of collar 40, and whose outer radial end is also arranged to form a yoke, for taking up an articulation, for instance a swivel, of the upper end of upper arm of a non-rotating compass linked by the lower end of its lower arm to the aircraft structure, so as to retain non-rotating disk 14' and prevent it from any rotation about the rotor Z—Z axis.

Similarly, the upper axial end of outer ring 31' of bearing 21' is integral with a radial collar 44 protruding towards the outside of bearing 21', and on the perimeter of which are bolted individually and separably by an axial crown of screws 45, the rotating link fittings of a modular assembly of such link fittings comprising four fittings such as 46, the outer radial end of each being arranged to form a yoke 47, and each of which is intended for linking swivel 47a of lower pitch connecting rod end such as 6 in FIG. 1, on four-blade rotor, said rotating link fitting assembly also comprising two rotating fittings (not shown), also bolted under the perimeter of upper collar 44 and also arranged as a yoke to take up the articulations, for instance of the swivel type, on the lower ends of the lower arms of the two rotating compasses such as 13 in FIG. 1, to drive in rotation the rotating disk 12' comprising outer ring 31' of bearing 21' with its collar 44 and the rotating link fittings of the corresponding assembly.

In the two link fitting assemblies described above, the three non-rotating fittings 42 are identical to one another, and the four rotating link fittings 46 are identical to one another, as are the two rotating fittings (not shown) linking the two rotating compasses such as 13. In addition, screws 45 simultaneously and rigidly attach to the collar 44 of inner ring 31', not only the rotating link fittings such as 46, but also an annular protection cover 48 which covers the upper ends of the two rings 30' and 31' of bearing 21', as well as the interface between them, in such a way as to protect bearing 21', which includes waterproofing with grease. This bearing 21' will preferably be a stainless steel bearing with inside rings 30' and outside rings 31' of a stainless material, also forming collars 40 and 44.

All the rotating link fittings such as 46, and the non-rotating link fittings such as 42, may be manufactured of an aluminum alloy or as an alternative, of a composite material having an aluminum or titanium metal matrix, each from a simple blank of the forged or dye-punched type or, as an alternative, from a more common blank or even a standard plate shaped by high-speed machining.

In the second example of FIGS. 5 to 9, we obtain (see FIG. 5) the bearing 21' with two ball races, the outer ring 31' of which is in a single part with upper collar 44, under the perimeter of which are bolted individually, by screws 45, all the rotating link fittings of the link fitting assembly equipping rotating disk 12', of which the only annular device consists of the outer ring 31', with its upper collar 44. This assembly of link fittings includes fittings 46 of a first type, in equal numbers to the rotor blades, and therefore to the pitch connecting rods such as 6 in FIG. 1; in this example, there are four fittings 46 because the rotor is a four-blade rotor, while fittings 46 are identical to one another and each arranged, in its outer radial end, to form a yoke 47 designed to be connected by a swivel-mounted link, to respectively one of the four pitch connecting rods. This set of rotating link fittings also includes at least one rotating fitting 49 of a second type, designed to be connected, also by a swivel-mounted link, to a corresponding driving device such as a rotary compass 13 of FIG. 1. In this example, all the rotating fittings include two identical fittings 49, placed diametrically opposite one another (see FIG. 6), and each bolted by two screws 45 under collar 44 between two rotor link fittings 46 of the first type, because this second example of a cyclic swashplate device has a rotary disk 12' driven in rotation by two rotating compasses such as 13 in FIG. 1.

Figure 5:
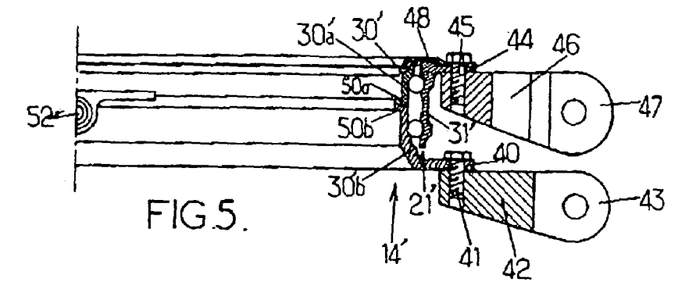
FIGS. 5 and 6 are views corresponding approximately and respectively to FIGS. 2 and 3 of the technical embodiment for a second example of the cyclic swashplate device according to the invention.

We also see that inner ring 30' of bearing 21', made of two inner half-rings 30'a and 30'b, mounted end to end axially and clamped one against the other by a crown of screws 39 screwed into the two inner radial collars 50a and 50b of the adjacent ends of half-rings 30'a and 30'b in order to pre-load bearing 21' on its lower half-ring 30'b to form a single piece with the outer lower radial collar 40, on the perimeter of which are bolted individually by screws 41, all the non-rotating link fittings of the modular link fitting assembly mounted on non-rotating disk 14', the inner ring 30' of bearing 21 of which, with lower collar 40, forms the sole annular device. This system of non-rotating fittings includes three identical fittings 42 of the first type, the outer radial end of each being arranged to form a yoke 43 for connection, by a swivel-mounted link, to respectively one of the three pilot control devices such as 17 in FIG. 1, controlling the translation and tilting of non-rotating disk 14'. The assembly of non-rotating link fittings shown in this example does not include a non-rotating fitting of a second type, designed for connection by a swivel-mounted or swiveling link, to at least one device retaining non-rotating disk 14' in rotation such as the non-rotating compass 16 of FIG. 1, because this second example includes a translation and tilting guide mechanism for non-rotating disk 14' which is of the universal joint ring type, sliding and oscillating on two non-rotating guide columns which simultaneously act as retaining devices for the non-rotating disk 14', preventing it from rotating about the rotor axis Z—Z.

Figure 6:
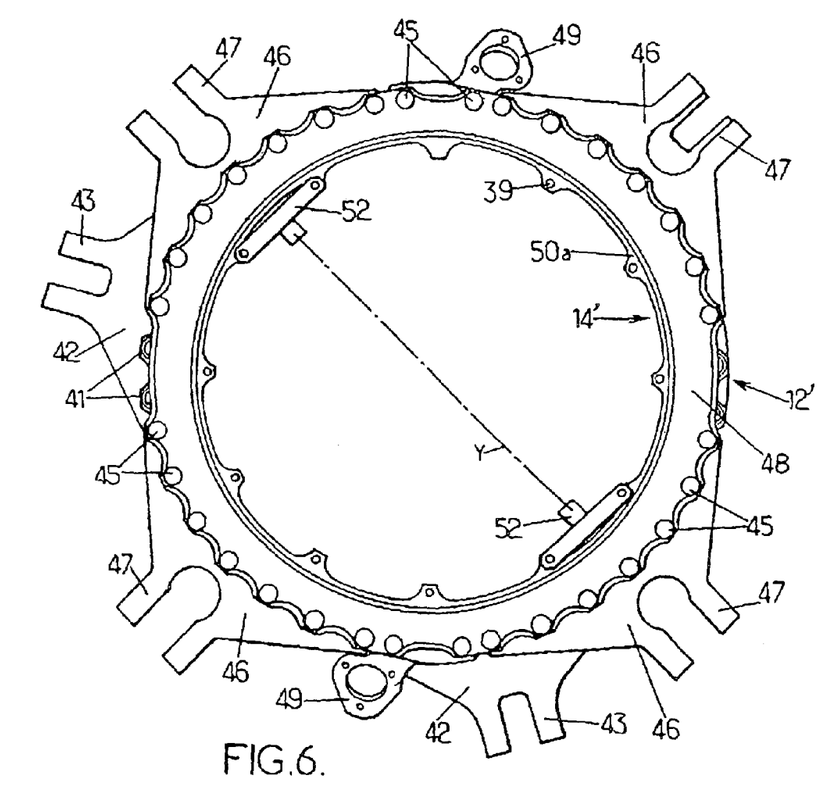
Figure 7:
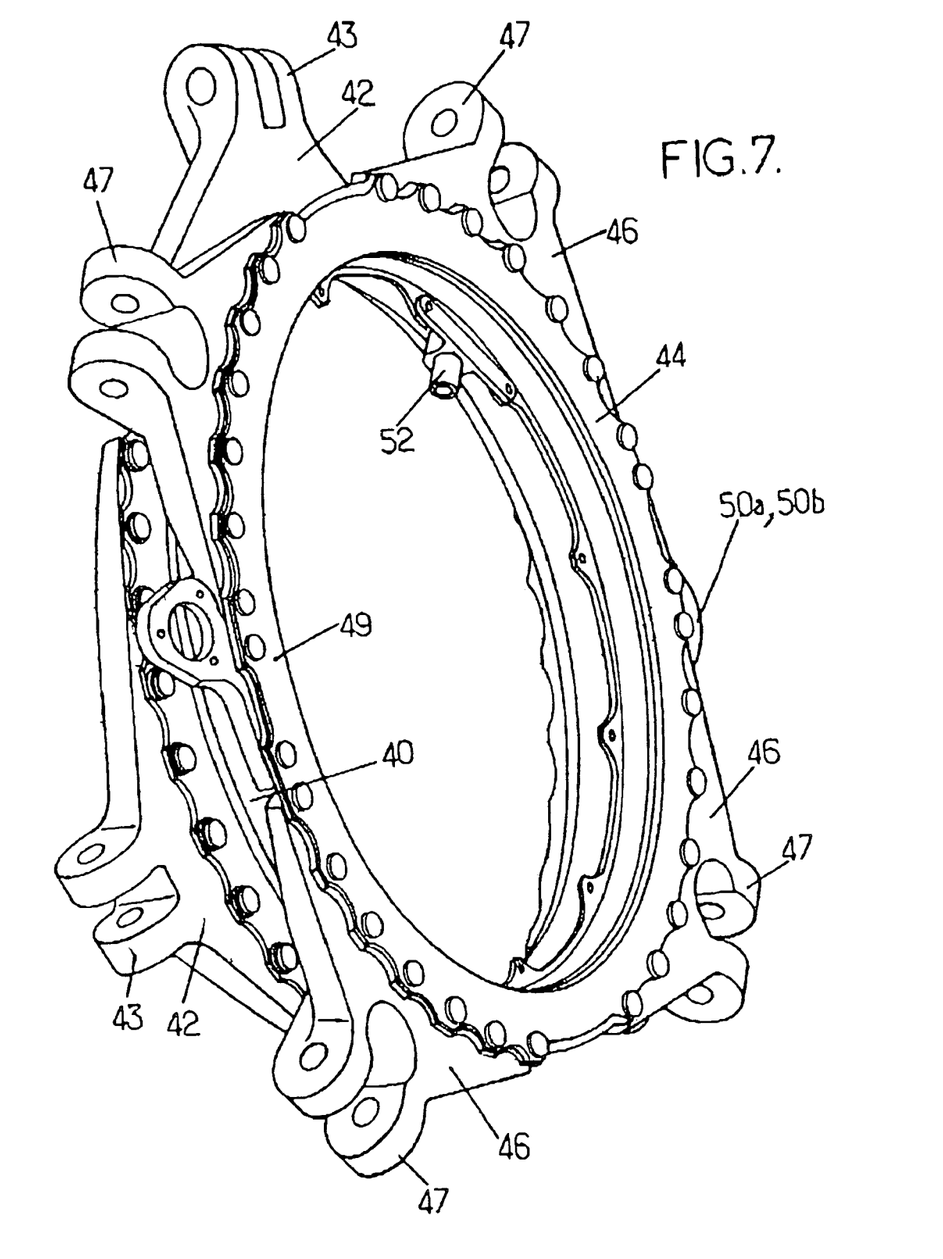
FIGS. 7 and 8 are schematic and perspective views of the side and respectively top and bottom of a cyclic swashplate assembly according to FIGS. 5 and 6.
Figure 8:
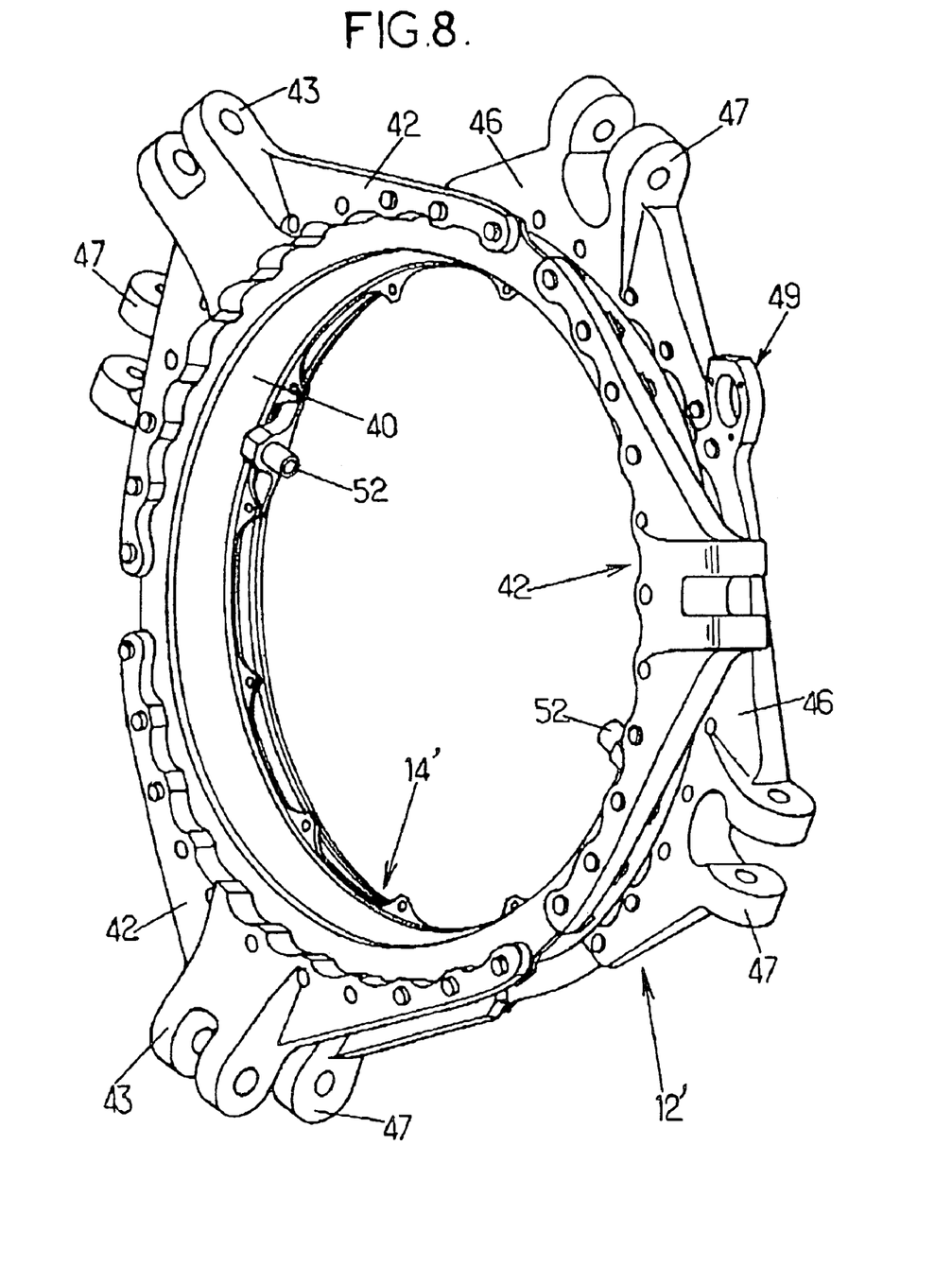

As shown in FIG. 6, the rotating link fittings 46 and 49 and the non-rotating link fittings 42, each having a more or less general triangular shape, with one side forming a concave circle arc, turned toward upper collar 44 or lower collar 40 corresponding to it, and forming a bolted attaching base thanks to screws 45 and 41 of the rotating link fittings 46 and 49 and non-rotating link fittings 42 respectively under collars 44 and 40 corresponding to them (see FIG. 5). On each of these fittings 46, 49 and 42, the apex opposite the concave circle arc side is arranged to form a yoke such as 47 and 43, with two parallel arms extending in planes that are more or less diametrical with respect to rotating disk 12' and non-rotating disk 14', whereas the yokes at the outer ends of interconnecting fittings 49 taking up the ends of rotating compasses have arms more or less perpendicular to the axis of the disks 12' and 14'.

In this example, there are also a protection cover 48 bolted by screws 45 onto upper collar 44 and covering the upper part of bearing 21'.

Concerning the translation and tilting guide mechanism of disks 12' and 14', this mechanism includes a universal joint link with a universal joint ring 51 (see FIG. 9), mounted to swivel on two trunnions 52 (see FIG. 6) that are coaxial and diametrically opposed with respect to the axis of disks 12' and 14', with a radial protrusion towards the inside of non-rotating disk 14' on which trunnions 52 are supported by screws 39 on internal radial collars 50a and 50b of internal ring 30' of bearing 21'. The swiveling links via which the non-rotating disk 14', and therefore the assembly of the two disks 12' and 14' turn about diametrical axis Y—Y of trunnions 52 on universal joint ring 51 are identified overall under 53 of FIG. 9. The universal joint ring 51 is also mounted to swivel about another diametrical axis X—X of this ring 51, which is perpendicular to the diametrical axis Y—Y of trunnions 52, by two coaxial swiveling links identified overall under 54 of FIG. 9, on two tubular slides 55, arranged to form bellows extending axially from the two sides of the ring of universal joint 51, each of which is designed to be mounted and slide on respectively one of the two guide columns (not shown), parallel to the Z—Z axis of the rotor and symmetrical with respect to one another and this axis, in the same diametrical plane passing through the latter, with the two columns attached to the rotorcraft structure.

A translation and tilting guide mechanism of this type, with a universal joint and a universal joint ring mounted to turn within the non-rotating disk, on the one hand, and on the other on the two slides sliding parallel to the rotor axis on the fixed columns, described with respect to FIGS. 5 and 6 of U.S. Pat. No. 6,280,141, which gives more details on this subject. The translation and tilting guide mechanism partially represented in FIG. 9 of this application can be obtained as described in the aforementioned U.S. Pat. No. 6,280,141, the disclosure of which is incorporated herein by reference and made a part of this disclosure. The disclosure of U.S. Pat. No. 6,033,182, is also incorporated herein by reference and made a part of this disclosure.

With respect to the embodiment of the technical situation as shown in FIGS. 2 and 3, it is clear that a cyclic swashplate device according to the invention will produce a reduction in the number of parts: upper flange 26 and lower flange 27 attaching bearing 21 of FIG. 2 and support 29 of seal 28 are eliminated. The assembly of a device according to the invention is also simplified with respect to those of the technical situation, because the non-rotating link fittings, such as 42, and rotating link fittings such as 46 and 49 are attached individually by a mechanical assembly not requiring any special tooling and not representing any risk of damaging the bores of the rotating and non-rotating disks during assembly. On a helicopter equipped with a device according to the invention, the user has the possibility of changing a rotating or non-rotating link fitting without removing the blades or hub of the rotor, whereas the embodiments of the technical situation, all the cyclic swashplates must be repaired by an approved repairer after the removal of the rotor. With the device of this invention, the user can remove a damaged link fitting on an aircraft at his own level of maintenance, meaning a substantial reduction in time and cost. In terms of preventive or predictive maintenance, in conformity with the modern principles of removal of mechanical components according to their state, the fact of removing on the cyclic swashplate device of the invention, modular link fittings that are economical and easily replaced, contributes to a substantial reduction in the cost of maintenance.

In addition, a set of cyclic swashplates according to the state of the technique weighs approximately 55 kg for a helicopter weighing between 8 and 10 t, whereas a set of cyclic plates built according to this invention weighs approximately 45 kg for the same helicopter definition.

Simultaneously, a set of cyclic swashplates built according to this invention costs approximately ten times less than one produced according to the customary techniques for a helicopter of the range mentioned above.

Thanks to this invention, it is also possible to modify an existing cyclic swashplate device. To do this, at the level of one and/or the other of the non-rotating and rotating disks, an intermediate ring can be added which allows, on the one hand, the force-fitting of the bearing ring linked with the corresponding swashplate and on the other, includes a removable and individual attaching collar for the corresponding modular link fittings.

The advantage of a configuration like this is to allow adaptation of at least one set of modular fittings to an existing cyclic swashplate device, while preserving the bearing and the assembly mode. This configuration can be adopted for either one of the inner and outer rings of the bearing.

The invention claimed is:

1. A cyclic swashplate device to control the pitch of rotorcraft rotor (1) blades (2), such as a main helicopter rotor, a rotor (1) on which each blade (2) is, on the one hand, driven in rotation about an axis of rotation (Z—Z), of a rotor (1) shaft (3) through a hub (4) integral in rotation with shaft (3), and on the other hand, integral in rotation about a longitudinal pitch change axis (A—A) of blade (2) of at least one pitch lever (5) controlled by a corresponding pitch connecting rod (6), said device (10') being of the type with two annular and coaxial disks (12', 14') enclosing rotor (1) axis (Z—Z) and mounted on an axial and tilting translation guide mechanism (11') of said disks with respect to rotor axis (Z—Z), and of which one is a rotating disk (12') connected, on the one hand to said hub (4) and/or said shaft (3) by at least one device driving (13) the rotating disk (12') to rotate with rotor (1) about its axis (Z—Z) and, on the one hand, each blade (2) by the corresponding pitch connecting rod (6), said rotating disk (12') being mounted in rotation by at least one bearing (21') on the other disk, which is a non-rotating disk (14') connected, on the one hand, to the structure (15) of said rotorcraft by at least one retaining device (16) immobilizing said non-rotating disk (14') in rotation about said rotor axis (Z—Z), and on the other, pilot control devices (17) soliciting the non-rotating disk (14') in such a way that the axial and/or tilting translation movements imposed on the non-rotating disk (14') from the pilot controls (17) are followed by the rotating disk (12'), which transmits the pitch to be set on the rotor (1) blades (2) by means of pitch connecting rods (6), with said rotating disk (12') comprising a modular set of interconnecting fittings (46) attached rigidly (45) and removably to an annular device (31') to ensure links between this rotating disk and the pitch connecting rods (6) and/or said at least one driving device (13), characterized in that said non-rotating disk (14') includes a modular set of link fittings (42) attached rigidly (41) and removably to an annular device (30') to ensure the links between this non-rotating disk and the pilot control devices (17) and/or said at least one retaining device (16).

2. Cyclic swashplate device according to claim 1, characterized in that said modular assembly of fittings linking said non-rotating disk (14') includes the first non-rotating link fittings (42) identical to one another in equal numbers to said pilot control devices (17), and of which each connects said non-rotating disk (14') to respectively one of said pilot control devices (17), and/or said modular set of link fittings of said rotating disk (12') includes the first rotating link fittings (46) identical to one another in equal numbers to said pitch connecting rods (6), and each of which connects said rotating disk (12') to respectively one of the pitch connecting rods (6).

3. Cyclic swashplate device according to claim 2 characterized in that said annular device of at least one of disks (14', 12') comprises respectively one of internal rings (30') and external rings (31') of the rotary assembly of rotating disk (12') on non-rotating disk (14).

4. Cyclic swashplate device according to claim 2, characterized in that said modular set of link fittings to said non-rotating disk (14') includes at least one second non-rotating link fitting in equal numbers to at least one said retaining device (16) to connect said non-rotating disk (14') to at least one retaining device (16), and/or said modular set of link fittings to said rotating disk (12') including at least a second rotating link fitting (49) in numbers equal to at least one driving device (13) to connect said rotating disk (12') to at least one said driving device (13).

5. Cyclic swashplate device according to claim 4, characterized in that said annular device of at least one of disks (14', 12') comprises respectively one of internal rings (30') and external rings (31') of the rotary assembly of rotating disk (12') on non-rotating disk (14).

6. Cyclic swashplate device according to claim 5, characterized in that said annular device comprising at least one disk (12', 14') is an intermediate ring, force-fitted with one of internal rings (30') and external rings (31') of said bearing (21').

7. Cyclic swashplate device according to claim 6, characterized in that the link fittings (42, 46–49) of a same disk (14', 12') are attached to said annular device (30', 31') of said disk by means of a collar (40, 41) integral with said annular device (30', 31') and to which said link fittings (42, 46–49) are each fitted separably.

8. Cyclic swashplate device according to claim 7, characterized in that each link fitting (42, 46–49) of a modular set is bolted (41, 45) onto corresponding collar (40, 44).

9. Cyclic swashplate device according to claim 8, characterized in that each interconnecting fitting (42, 46–49) has a plane shape that is more or less triangular with one side forming a concave circle arc arranged as an attaching base to part of the perimeter of said corresponding annular device or said corresponding collar (40, 44), while the apex opposite said concave side is arranged to form a yoke (43, 47) or an end-fitting accommodating a swivel end of a pitch connecting rod (6) or a pilot control device (17) or driving device (13) or retaining device (16) corresponding to it.

10. Cyclic swashplate device according to claim 9, characterized in that ring (31') of bearing (21'), which is linked in rotation with the rotating disk (12'), is integral with an upper collar (44) protruding more or less radially towards the outside of bearing (21') from the upper axial end of said ring (31') linked with the rotating disk (12') and with respect to rotor axis (Z—Z), whereas the other bearing (21') ring (30') linked with the non-rotating disk (14') is integral with a lower collar (40) protruding more or less radially toward the outside of bearing (21') from the lower axial end of said other ring (30') linked with non-rotating disk (14').

11. Cyclic swashplate device according to claim 10, characterized in that each pilot control device (17) is connected by a swivel-mounted link to respectively one of said first non-rotating link fittings (42) attached removably to said lower collar (40) and/or each pitch connecting rod (6), connected by a swivel-mounted link to respectively one of the first rotating link fittings (46) attached removably to said upper collar (44).

12. Cyclic swashplate device according to claim 11, characterized in that at least one of said retaining devices (18) is connected by a swivel-mounted link to a second non-rotating link fitting respectively attached removably to said lower collar (40) and/or at least one said driving device (13) is connected by a swivel-mounted link to a second rotating link fitting (49) respectively attached removably to said upper collar (44).

13. Cyclic swashplate device according to claim 12, characterized in that the interconnecting fittings (42, 46–49) of at least one modular set are made of aluminum alloy or of a composite material using an aluminum or titanium metal matrix from forged or dye-punched blanks or plates.

14. Cyclic swashplate device according to claim 13, characterized in that one (30') of bearing rings (21'), integral with one of the two non-rotating disks (14') and rotating disks (12') connected to said translation and tilting guide mechanism (11') is subdivided into two half-rings (30–a, 30'b) placed axially end to end, and each of which is provided respectively with two adjacent radial collars (50a, 50b), clamped (39) endwise against one another to ensure the pre-stressing of bearing (21') and to which said star (14') is attached to said translation and tilting guide mechanism (11').

15. Device according to claim 14, characterized in that the said translation and tilting guide mechanism (11') includes a central swivel (18'), centered on rotor axis Z—Z on which the non-rotating disk (14') is assembled to oscillate by at least one plate (19') with a spherical cap bearing surface, with said swivel (18') being mounted to slide parallel to the rotor axis (Z—Z) about which cylindrical guide (20') coaxial with rotor axis (Z—Z) and not rotating about said rotor axis (Z—Z) and preferably attached with respect to the structure (15) of the rotorcraft.

16. A device according to claim 14, characterized in that said translation and tilting guiding mechanism includes a universal joint link, with a universal joint ring (51) mounted so as to pivot on the one hand about a first diametrical axis, perpendicular to the rotor axis (Z—Z) by two swiveling links (54) mounted coaxially on two sides (55) each guided in axial translation on respectively one of the two guide columns parallel to the rotor axis (Z—Z) and symmetrical with respect to one another compared to said axis (Z—Z), in the same diametrical plane passing through the latter and, on the other hand, about a second diametrical axis, perpendicular to the first diametrical axis, by two swiveling links (53) with trunnions (52), that are coaxial and diametrically opposed, connecting the universal joint ring (51) to the ring (14') of the two non-rotating (14') and rotating (12') disks, connected to said translation and tilting guiding mechanism.

17. Cyclic swashplate device according to claim 1, characterized in that said annular device comprising at least one disk (12', 14') is an intermediate ring, force-fitted with one of internal rings (30') and external rings (31') of said bearing (21').

18. Cyclic swashplate device according to claim 1, characterized in that the link fittings (42, 46–49) of a same disk (14', 12') are attached to said annular device (30', 31') of said disk by means of a collar (40, 41) integral with said annular device (30', 31') and to which said link fittings (42, 46–49) are each fitted separably.

19. Cyclic swashplate device according to claim 1, characterized in that each interconnecting fitting (42, 46–49) has a plane shape that is more or less triangular with one side forming a concave circle arc arranged as an attaching base to part of the perimeter of said corresponding annular device or said corresponding collar (40, 44), while the apex opposite said concave side is arranged to form a yoke (43, 47) or an end-fitting accommodating a swivel end of a pitch connecting rod (6) or a pilot control device (17) or driving device (13) or retaining device (16) corresponding to it.

20. A cyclic swashplate device to control the pitch of rotorcraft rotor blades, such as a main helicopter rotor, a rotor on which each blade is, on the one hand, driven in rotation about an axis of rotation (Z—Z), of a rotor shaft through a hub integral in rotation with shaft, and on the other hand, integral in rotation about a longitudinal pitch change axis (A—A) of blade of at least one pitch lever controlled by a corresponding pitch connecting rod, said device being of the type with two annular and coaxial disks enclosing rotor axis (Z—Z) and mounted on an axial and tilting translation guide mechanism of said disks with respect to rotor axis (Z—Z), and of which one is a rotating star connected, on the one hand to said hub and/or said shaft by at least one device driving the rotating disk to rotate with said rotor about its axis (Z—Z) and, on the one hand, each blade by the corresponding pitch connecting rod, said rotating disk being mounted in rotation by at least one bearing on the other disk, which is a non-rotating disk connected, on the one hand, to the structure of said rotorcraft by at least one retaining device immobilizing said non-rotating disk in rotation about said rotor axis (Z—Z), and on the other, pilot control devices which control the non-rotating disk in such a way that the axial and/or tilting translation movements imposed on the non-rotating disk from the pilot controls are followed by the rotating disk, which transmits the pitch to be set on the rotor blades by means of pitch connecting rods, with said rotating disk comprising a modular set of interconnecting fittings attached rigidly and removably to an annular device to ensure links between the rotating disk and the pitch connecting rods and/or said at least one driving device, characterized in that said non-rotating star includes a modular set of link fittings attached rigidly and removably to an annular device to ensure the links between this non-rotating disk and the pilot control devices and/or said at least one retaining device.

* * * * *